(No Model.)
W. A. CHILDS.
GALVANIC BATTERY.
No. 405,246. Patented June 18, 1889.
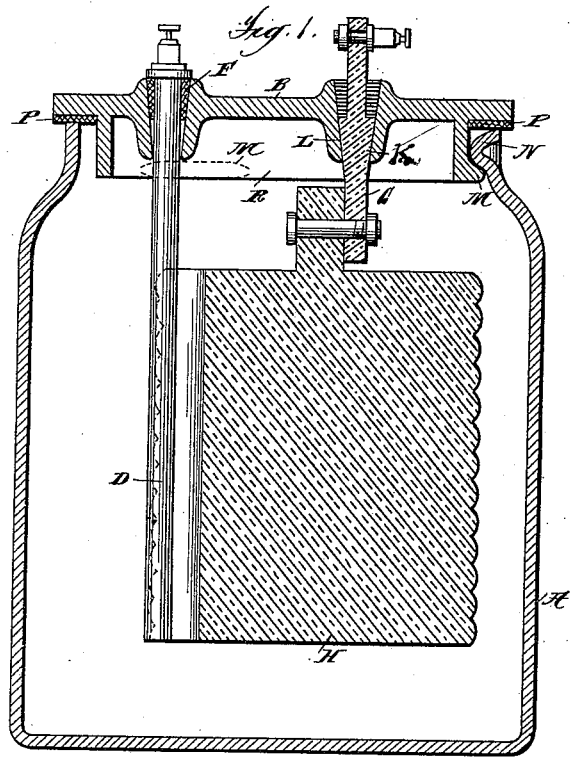
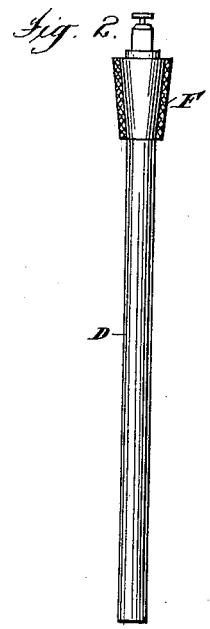
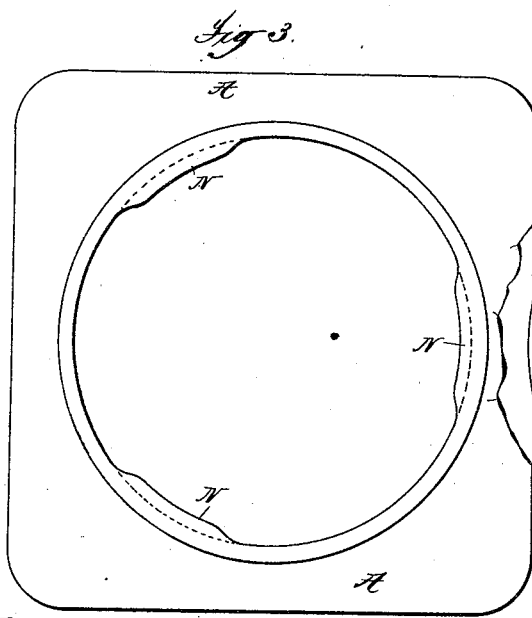
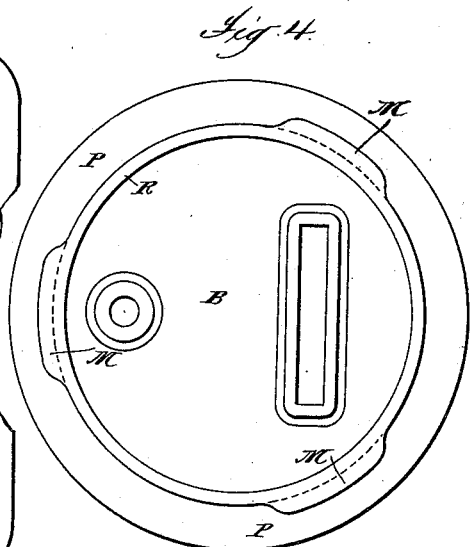
Attest:
Geo. H. Botts.
W. H. Capel.
Inventor
Wm. A. Childs
By Townsend & MacArthur
Att'ys
N. PETERS, Photo-Lithographer, Washington, D. C.

UNITED STATES PATENT OFFICE.

WILLIAM A. CHILDS, OF ENGLEWOOD, NEW JERSEY.

GALVANIC BATTERY.

SPECIFICATION forming part of Letters Patent No. 405,246, dated June 18, 1889.

Application filed February 6, 1888. Serial No. 263,105. (No model.)

*To all whom it may concern:*

Be it known that I, WILLIAM A. CHILDS, a citizen of the United States, and a resident of Englewood, in the county of Bergen and State of New Jersey, have invented a certain new and useful Galvanic Battery, of which the following is a specification.

My invention relates to the manner of supporting the positive and negative electrodes of a galvanic battery in the top or cover plate of the battery-cell, and also to form of the cover and the manner of securing the same to the jar.

The invention is designed more especially as an improvement upon the form of battery described in Patent No. 255,597, granted to William A. Childs and Frank Shaw, and dated March 28, 1882, but may be applied likewise to any form of single fluid or other battery.

The object of my invention is more particularly to provide a simple and effective support for the electrodes of such character that they shall not be liable to lateral or vertical downward displacement.

A further object of the invention is to so form the supporting part of the electrode or continuation of the same that a simple and effective seal shall be produced at the point where the element or continuation of the same passes through the perforation in the battery-cover.

My invention consists, essentially, in forming the battery element or the plate or rod constituting a continuation of the same with a taper at the point where it passes through the perforation in the battery-cover.

My invention consists, further, in forming a carbon plate, which constitutes an upward extension from the active portion of the carbon element, with a taper at the point where it passes through a perforation in the cover-plate.

My invention consists, also, in certain features whereby a very effective seal may be produced by the application of cementing or sealing material, as will be hereinafter described.

In the accompanying drawings, Figure 1 is a vertical section through a battery constructed in accordance with my invention. Fig. 2 is a side elevation of a modified form of zinc element. Fig. 3 is a plan of the battery-jar. Fig. 4 is a plan of the cover inverted.

B indicates the cover-plate for the jar, which is attached to said jar in the manner to be presently described, and is provided with perforations, through which the battery elements or extensions from such elements pass.

D indicates the zinc or positive electrode.

H H indicate an electrode of carbon made of any desired form, preferably in such form as will give large surface.

G indicates a plate or rod of carbon or other suitable material, forming an upward extension from the active portion of the carbon electrode and passing through a perforation in the cover-plate. The extension G is connected to the active portion of the carbon element or electrode in any desired manner. The manner of attachment is immaterial so far as concerns my present invention.

The zinc or positive electrode D has an elastic washer F, as shown, which washer seats in a conical or tapered opening formed in the cover-plate B, as shown, thereby sealing the battery at this point and holding the electrode firmly in place, so that its lower end cannot be readily moved to one side to make contact with the negative. The element D is in the present case supposed to be cylindrical, though it might be of any other shape.

I make the negative element in the form of a cylinder of carbon or other suitable material, and of as large size as the capacity of the battery-jar will conveniently permit, in order to increase as far as possible the depolarizing capacity. In order to secure compactness the element H is provided with a groove or recess in its side to form a space for the zinc or positive element. By this means the internal resistance of the battery is decreased to a considerable extent by bringing the carbon into close proximity with the zinc. The extension G from the active portion of the carbon element is preferably flat or elongated in a longitudinal direction, and at its point K is provided with a taper where it engages with the perforation or opening formed in the cover-plate V. By this taper the element is firmly supported against downward displacement, and by wedging action is firmly held against lateral displacement. At the same time the close engagement of the taper with the edges of the opening forms a good seal, which may, however, be supplemented by the use of cement or wax, if desired. When cement or wax is employed, as in the prior patent referred to, to form a seal at the opening, it is preferred to leave a space above the taper in the opening through the cover-plate, as shown, into which the wax or cement may be introduced. I prefer to give the opening in the cover-plate a taper corresponding to that on part G. With this form of plate and opening a very effective seal is made, and the cement or wax applied cannot readily run through into the cell when softened by heat.

The usual binding-posts for the attachment of conducting-wires are provided, as well understood in the art.

It is obvious that the zinc element might be formed with a taper corresponding to the taper of the opening in the cover-plate, although this is not necessary when an elastic washer is employed. The modification I have indicated in Fig. 2.

For the purpose of locking and sealing the cover to the jar A, I provide the cover-plate with a depending flange R, adapted to enter the neck of the jar instead of embracing the outside of the neck, and provided with a suitable number of projections or lugs M of any desired shape, which can be turned by turning the cover so as to engage and lock with suitably-placed lugs or projections N on the interior of the neck. A washer P, placed between the cover and top edge of the jar, completes the sealing when compressed between the cover and jar by the turning of the two sets of lugs or projections into engagement.

It will of course be understood that one or both sets of lugs are properly beveled or inclined on their engaging surface to bring the cover down into close contact with the jar.

I do not limit myself to the number of projections, which may consist of separate projections or of a single continuous projection—such as a screw-thread. The washer P, which may conveniently be made of rubber, grasps the flange of the cover, so that it may be detached therewith when the solution is to be renewed, thus avoiding the danger of wetting the washer, which it is not possible to do when the washer clasps the outside of the neck.

By making the cover with outside lugs in its flange to engage with inside lugs on the neck of the jar, instead of placing the lugs on the inside of cover-flange and corresponding lugs outside of the jar-neck, I avoid the difficulty arising from the locking of the battery-salts between the jar-neck and cover-flange, while at the same time, the flange being of smaller diameter, the cover is greatly strengthened. There are the further advantages from this construction that the mouth of the jar may be made more cheaply, because it does not require a mold with a complicated sectional plunger.

With the new form the cover may be molded with the beveled or tapered openings extending farther below the upper side of the cover than in the old.

I do not limit myself to a flat supporting-plate G, as the same may be made round or in any other form in cross-section.

What I claim as my invention is—

1. The detachable zinc or positive electrode supported in a tapered opening in the top plate of the battery, as and for the purpose described.

2. The detachable zinc or positive electrode supported in the tapered opening in the top plate, and provided with an elastic washer adapted to enter said opening, as and for the purpose described.

3. The combination, with the tapered supporting-conductor for the negative element, of a correspondingly-tapered opening in the top or cover plate, as and for the purpose described.

4. The combination, with the perforated cover or top plate, of the supporting-conductor having a taper formed at a point below the top edge of the perforation and engaging with a correspondingly-tapered portion of the latter.

5. In a galvanic battery, a carbon plate or rod forming an extension of the active carbon element, provided with a taper at the point where it passes through a perforation in the battery-cover.

6. In a galvanic battery, the carbon plate G, passing through the battery-cover and tapered at the point where it engages with said cover, as and for the purpose described.

Signed at New York, in the county of New York and State of New York.

WILLIAM A. CHILDS.

Witnesses:
WM. H. CAPEL,
HUGO KOELKER.